Patented Nov. 20, 1923.

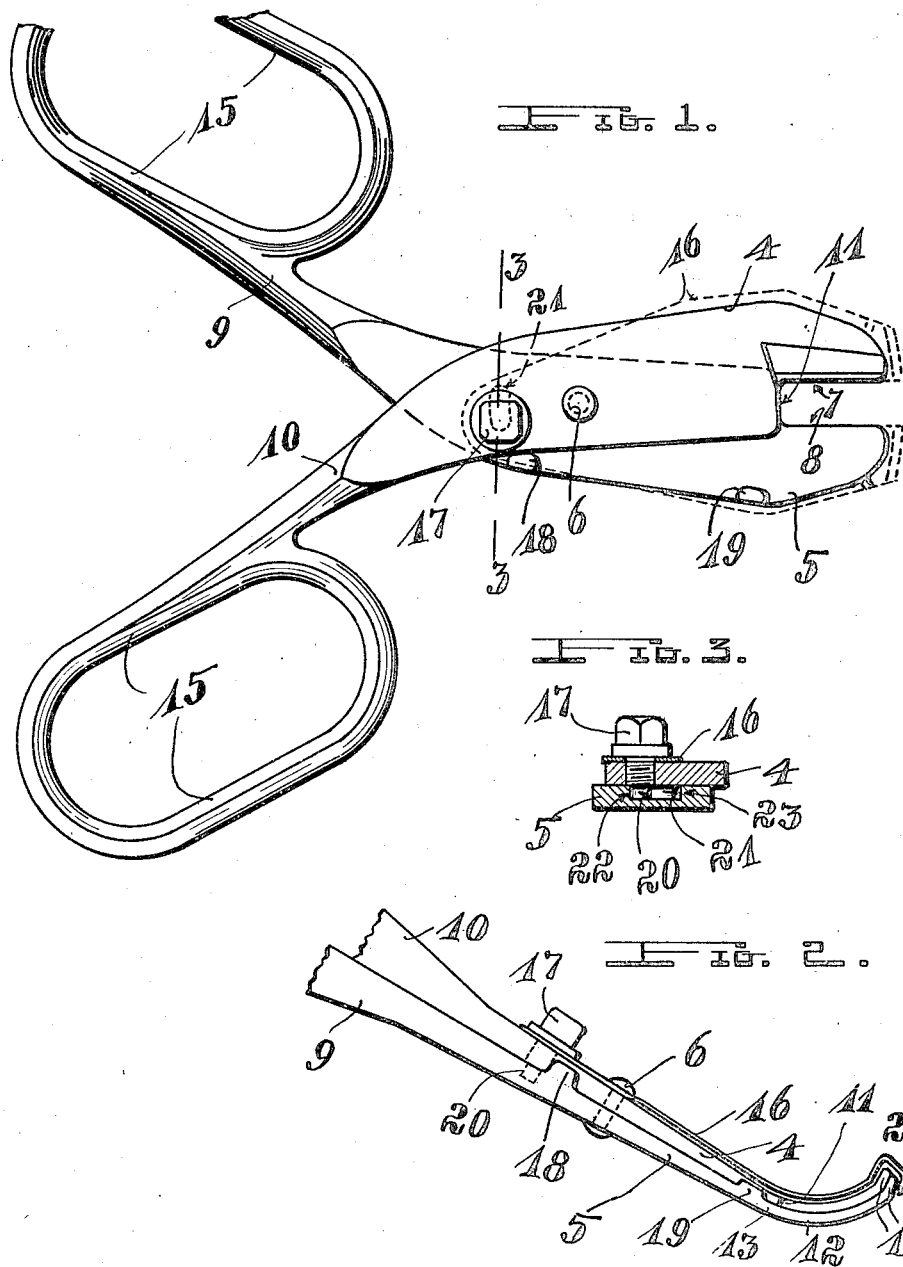

1,474,799

UNITED STATES PATENT OFFICE.

MELINDA A. STARKEY, OF LOS ANGELES, CALIFORNIA.

FRUIT SNIP.

Application filed January 17, 1922. Serial No. 529,929.

*To all whom it may concern:*

Be it known that I, MELINDA A. STARKEY, a subject of the King of Great Britain, residing at Los Angeles, in the county of Los Angeles and State of California, have invented a new and useful Fruit Snip, of which the following is a specification.

This invention relates to devices for snipping and cutting fruit while gathering it from trees.

One of the objects of this invention is to provide a tool which will not injure or mar the fruit.

Another object is to provide a tool with a protecting shield to avoid a cutting or catching in the fruit while the tool is being used for snipping off the stems from oranges, grape-fruit, and other similar fruits.

Another object is to provide a snip with curved jaws so that the points or front terminations become located above or away from the point of cutting.

Other objects will appear from the following description and appended claims as well as from the accompanying drawing, in which—

Fig. 1 is a top plan view of a snip embodying the invention.

Fig. 2 is a fragmentary side elevation of the device in Fig. 1, illustrating the curved jaw portions and the protecting shield.

Fig. 3 is a cross section on line 3—3 of Fig. 1, illustrating a slightly modified form of stop between the jaw members.

Common snips and scissors close gradually, beginning to cut at a point near the pivot connection between the cutting jaws, and bringing the point of cutting gradually further towards the terminations or ends of the jaws, as the jaws close.

A cutting or snipping with tools of this type is liable to cause material to slip from between the jaws as soon as the jaws touch such material, by reason of the inclined position of the jaws upon touching the article or material.

In cutting the fruit from the stems, the jaws of common scissors have the tendency to slip in the manner set forth above, since the stems are normally difficult to grip on account of the skin on the stems. Such a slipping, however, is liable to cause the operator handling the tool to allow the tool to touch the fruit resulting in a marring of the fruit.

One of the main objects of this invention is to overcome such a slipping. In Fig. 1, the two jaw members 4 and 5 are pivotally connected at 6. The jaws are illustrated in open position, showing the cutting edges 7 and 8 in nearly parallel relation, so that the jaws can easily take hold of a stem so as to avoid a slipping of the stem from the tool. Handle portions are provided on each of the jaws as indicated at 9 and 10, projecting and extending rearwardly from the pivot connection of the jaws. The jaws are preferably shouldered as indicated at 11 to assure the correct location of the tool for cutting.

Beginning at the shouldered point, the jaws are curved as illustrated in Fig. 2 in side elevation, so that the cutting is normally accomplished at the point 12, while the points 13 and the front terminations 14 of the jaws curve away from the point of cutting or operation.

A very close cutting can be accomplished with a tool of this construction without running the risk of injuring or marring the fruit.

The points of the jaws and all other outwardly projecting portions or parts of the tool are preferably formed to offer no possibilities of catching in or on the articles or material on which the tool is being used. All corners or terminations are preferably rounded off, and the surfaces made especially smooth to avoid injury or marring of the articles or material on which the tool is being used.

The rear terminations of the handle portions are made in forms similar to the handles of scissors and shears, as indicated at 15, however, of a suitably large size to be convenient for large hands.

A protecting shield 16 is indicated in dotted lines in the top plan view of Fig. 1, since this shield, if illustrated in full lines, would cover both cutting jaws, and would thereby make this illustration obscure. The shield 16 is clearly illustrated in the side elevation in Fig. 2. Pivotally engaging at 6, together with the two jaws 4 and 5, the shield is held in its proper shielding and protecting position by the set screw 17. On removing the set screw 17, the shield 16 can be swung around the pivot 6, to allow a resharpening or grinding of the cutting blades or jaws 4 and 5.

A stop 18 is provided to limit the opening movement of the tool. The stop 19 is provided to limit a closing movement of the tool. The set screw 17 is furthermore provided with an extension end 20, extending beyond the thickness of the one cutting blade or jaw into the second jaw, as is more clearly illustrated in Figs. 2 and 3. A groove or recess 21 is provided in one of the cutting blades or jaws to allow a swinging movement of the two cutting blades or jaws, controlled by the screw end 20 within the recess 21, as is also indicated in Fig. 1.

The stops 18 and 19, above referred to are under normal conditions sufficient for controlling the swinging movement between the two jaws, but these stops are in positions that they may eventually be broken off, in which case there would be no control. The stops 18 and 19 are furthermore in positions subject to the objection that they might injure or mar fruit, for which reason they may be left off when so desirable.

The stop-control between the screw end 20 and the recess 21 also suffice under normal conditions, and may therefore be applied without the stops 18 and 19. The stop-control between the jaws, that is, the stop between the screw-end 20 and the recess 21, has furthermore the advantage of being practically within the tool, not protruding anywhere through the material of the tool towards the outside. The screw 17 is illustrated as having a square head, allowing a handling with a suitable socket-wrench, but it will easily be understood that the head of the screw may be modified slightly in various ways, as with a rounded top provided with a slot to be used with a screw-driver, or even a countersunk head, without departing from the principle of the invention.

The front end of the shield is designed to reach over the points or front ends of the cutting blades or jaws. The front points 14 of the jaws are preferably bent to an extent that the front termination 23 of the shield comes practically within the contour, that is, the continuation of the general curves of the jaws, as will be understood from the illustration of Fig. 2. This arrangement prevents a catching or cutting with the front ends of the jaws in fruit.

The base of the stem normally grows in a hollow of fruit. In packing fruit, if the stem is left on the fruit, one stem of one of the fruit is liable to make an impression in other fruit and thereby injure and mar it. It is therefore desirable that the stem be cut off within the hollow of the fruit, so that a stem cannot mar fruit when packed.

The front ends of the jaws 4 and 5 are therefore curved to reach into the hollow of fruit so that a fruit-stem can be cut short enough that it could not possibly mar another fruit when packed one close to the other.

Having thus described my invention, I claim:

1. In a fruit snip, jaw members having their terminations curved upwardly, and a protecting shield applied to the normal top side of the jaws having a bifurcated front end forming the cutting opening and extending over the front ends of the jaws terminating short on the underside of the curved front ends and spaced from the lowermost actual point of cutting of the jaws and adapted to allow the jaw members to close for cutting purposes.

2. In a fruit snip, two pivotally connected members having handle portions projecting away from the pivot connection in one direction and having jaw portions projecting away from the pivot connection in the opposite direction, the cutting edges of the jaw portions being in nearly parallel relation in open position, a shoulder formed on each of the jaw members at nearly right angles to the cutting edges for forming a cutting point between the jaw members, the front ends of the jaws being curved so as to project away from the underside upwardly in front and rear of the cutting point, a protecting shield pivotally engaged to the pivot of the jaws and extending over the jaw portions terminating below the front termination of the jaw portions having a bifurcated front end, and a screw for holding the protecting shield in operating position in relation to the jaw portions and for forming a stop in either direction of the movements of the pivotally connected members.

3. In a fruit snip, two pivotally connected members having handle and upwardly curved jaw portions, a protecting shield engaging with one of the jaw portions and extending over the top side of both jaw portions having a bifurcated front end forming the cutting opening and terminating on the underside of the front ends of the jaw portions, and stop members in positions to control the movements of the pivotally connected members.

In testimony that I claim the foregoing as my invention I have signed my name in the presence of two subscribing witnesses.

MELINDA A. STARKEY.

Witnesses:
EUNICE M. SMITH,
REGINALD W. CLAPP.